US012296394B2

(12) United States Patent
Nakazawa et al.

(10) Patent No.: US 12,296,394 B2
(45) Date of Patent: May 13, 2025

(54) CHUCK DEVICE

(71) Applicants: CITIZEN WATCH CO., LTD., Tokyo (JP); CITIZEN MACHINERY CO., LTD., Nagano (JP)

(72) Inventors: Sakae Nakazawa, Kitasaku-gun (JP); Masao Sakai, Niza (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 545 days.

(21) Appl. No.: 17/771,203

(22) PCT Filed: Nov. 6, 2020

(86) PCT No.: PCT/JP2020/041489
§ 371 (c)(1),
(2) Date: Apr. 22, 2022

(87) PCT Pub. No.: WO2021/100489
PCT Pub. Date: May 27, 2021

(65) Prior Publication Data
US 2022/0355390 A1 Nov. 10, 2022

(30) Foreign Application Priority Data
Nov. 20, 2019 (JP) ................. 2019-209243

(51) Int. Cl.
*B23B 31/18* (2006.01)
*B23B 31/19* (2006.01)
(52) U.S. Cl.
CPC .............. *B23B 31/18* (2013.01); *B23B 31/19* (2013.01); *B23B 2270/09* (2013.01); *Y10T 279/18* (2015.01)

(58) Field of Classification Search
CPC ....... B23B 31/18; B23B 31/185; B23B 31/19; B23B 2270/09; Y10T 279/18; Y10T 279/188
See application file for complete search history.

(56) References Cited

U.S. PATENT DOCUMENTS 1,812,006 A    6/1931  Jellicoe
1,823,902 A *  9/1931  Jellicoe ................. B23B 31/185
                                                        279/106
(Continued)

FOREIGN PATENT DOCUMENTS

CN    106346032 A    1/2017
EP    1 127 642 A2   8/2001
(Continued)

OTHER PUBLICATIONS

International Search Report, issued in PCT/JP2020/041489, dated Dec. 28, 2020.
(Continued)

*Primary Examiner* — Eric A. Gates
(74) *Attorney, Agent, or Firm* — CANTOR COLBURN LLP

(57) ABSTRACT

A chuck device for holding a plate material workpiece supplied to a machine tool without deforming the workpiece is provided. A housing has a workpiece contact surface arranged to face workpiece holding claws, and when holding of a workpiece is released, a plurality of rods integrally swings so that the workpiece holding claws are moved away from the workpiece contact surface of the housing and moved away from each other, and when holding the workpiece, after the plurality of rods integrally swing so that the workpiece holding claws are brought close to the workpiece contact surface of the housing and brought close to each other, the plurality of rods moves integrally in parallel with
(Continued)

the forward/backward moving direction of a drive body to bring the workpiece holding claws into contact with the workpiece.

1 Claim, 8 Drawing Sheets

(56) References Cited

U.S. PATENT DOCUMENTS

| | | | | | |
|---|---|---|---|---|---|
| 1,882,975 | A | * | 10/1932 | Schmidt | B23B 31/185 |
| | | | | | 279/106 |
| 2,361,763 | A | * | 10/1944 | Goddard | B23B 31/185 |
| | | | | | 279/106 |
| 2,865,643 | A | * | 12/1958 | Parker | B23B 31/025 |
| | | | | | 279/106 |
| 6,199,873 | B1 | * | 3/2001 | Roudier | B23B 31/185 |
| | | | | | 279/2.24 |

FOREIGN PATENT DOCUMENTS

| | | | | | |
|---|---|---|---|---|---|
| EP | 1862241 | A1 | * | 12/2007 | B23B 31/12 |
| FR | 2755049 | A1 | * | 4/1998 | B23B 31/185 |
| FR | 2850306 | A1 | * | 7/2004 | B23B 31/185 |
| JP | 3-277408 | A | | 12/1991 | |
| JP | 9-57508 | A | | 3/1997 | |
| JP | 2004-154876 | A | | 6/2004 | |

OTHER PUBLICATIONS

Written Opinion of the International Searching Authority, issued in PCT/JP2020/041489, dated Dec. 28, 2020.

* cited by examiner

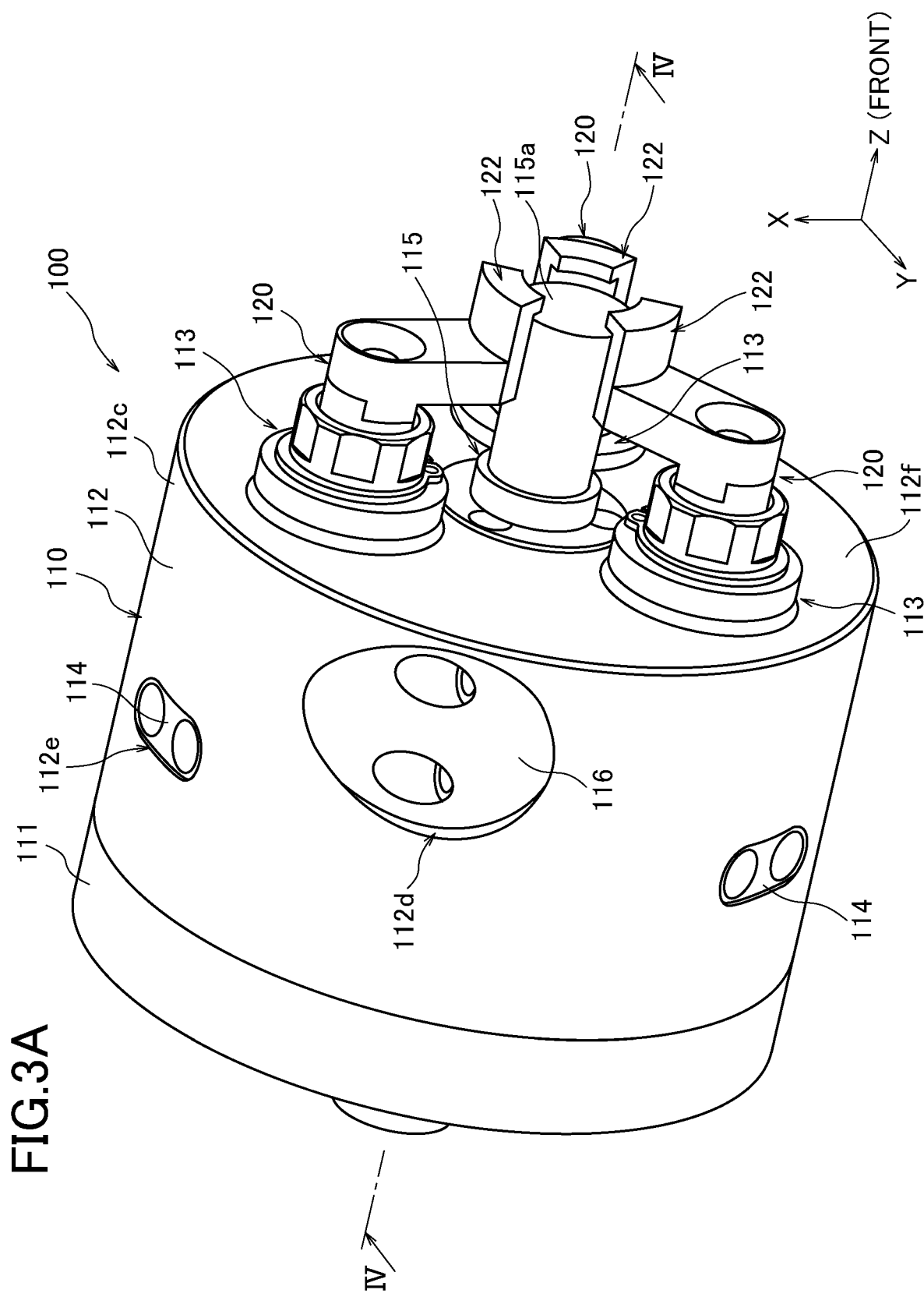

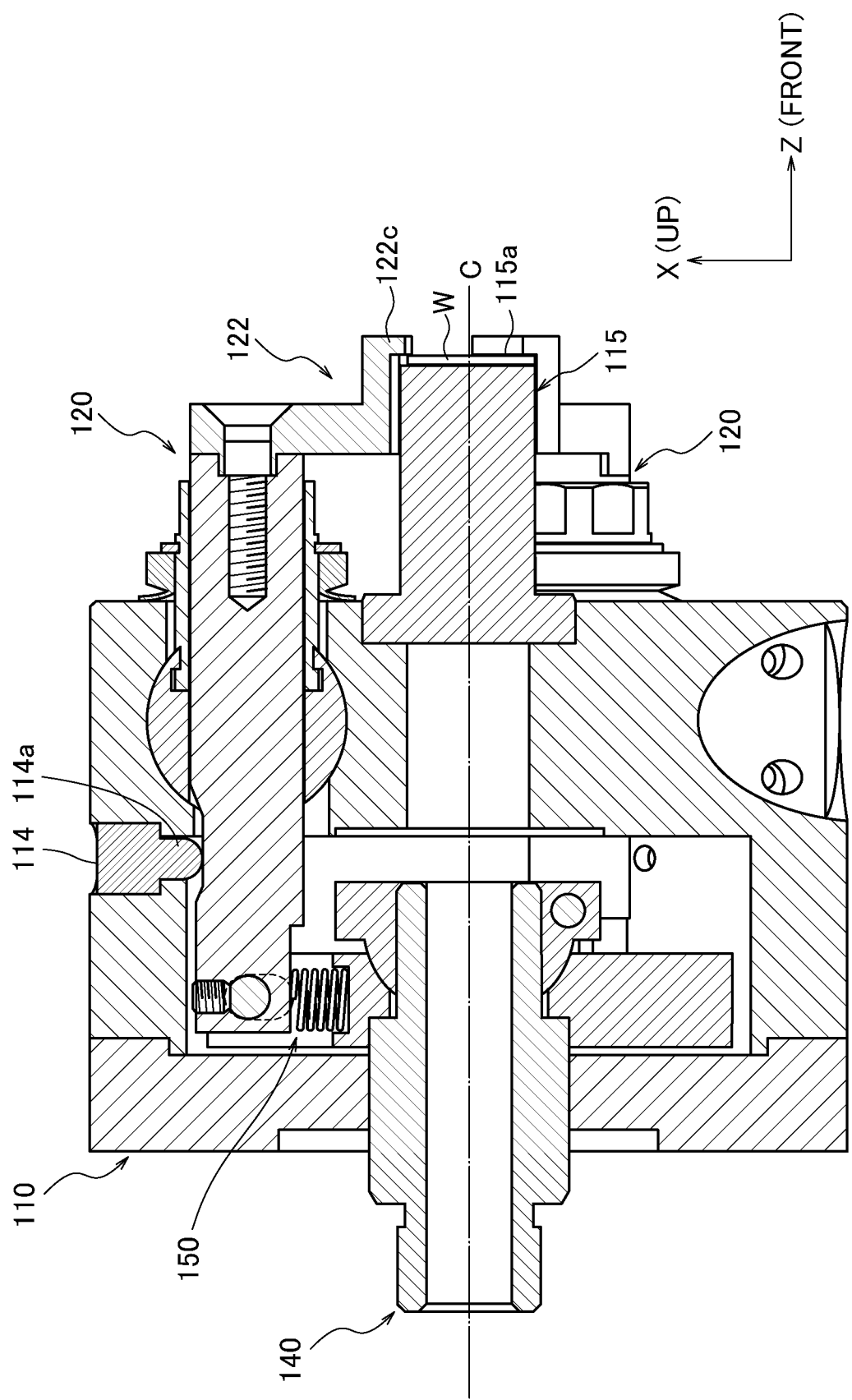

CHUCK DEVICE

TECHNICAL FIELD

The present invention relates to a chuck device for holding a workpiece supplied to a machine tool, and more particularly to a chuck device provided with a plurality of workpiece holding claws.

BACKGROUND ART

Conventionally, as a chuck device for gripping a workpiece, a workpiece chuck device is known which comprises: a chuck main body; a reference fixing claw that is fixed to one end side of the chuck main body and is for supporting one end of the workpiece; a movable claw that is provided on one end side of the chuck main body so as to be able to be opened and closed with respect to the reference fixing claw and is for supporting one end portion of the workpiece; drive means for opening and closing the movable claw; and a stopper for supporting the other end of the workpiece (for example, in the patent literature 1).

CITATION LIST

Patent Literature

[Patent Literature 1] JP 2004-154876 A

SUMMARY OF INVENTION

Technical Problem

In the workpiece chuck device described above, the side of the workpiece is clamped by the claws. Therefore, when the workpiece is a plate material, the workpiece may be deformed or buckled.

Therefore, the present invention is for solving the problem of the prior art as described above, that is, the object of the present invention is to provide a chuck device for holding a plate material workpiece supplied to a machine tool without deforming the workpiece.

Solution to Problem

Firstly, the present invention is characterized by a chuck device comprising: a plurality of rods provided with workpiece holding claws for holding a workpiece supplied to a machine tool; a support body for supporting each of the plurality of rods; a housing for swingably accommodating each of the plurality of rods around the support body; and a drive body for integrally moving forward and backward the plurality of rods with respect to the housing, wherein the housing has a workpiece contact surface that is arranged so as to face the workpiece holding claws, wherein when holding of the workpiece is released, the plurality of rods integrally swing so that the workpiece holding claws are moved away from the workpiece contact surface of the housing and moved away from each other, and wherein when holding the workpiece, after the plurality of rods integrally swing so that the workpiece holding claws are brought close to the workpiece contact surface of the housing and brought close to each other, the plurality of rods move integrally in parallel with the forward/backward moving direction of the drive body to bring the workpiece holding claws into contact with the workpiece.

Secondly, the present invention is characterized in that the chuck device is provided with a rod swing mechanism for swinging each of the plurality of rods around the support body, the rod swing mechanism has a guide groove and a protrusion for engaging with the guide groove, when the protrusion and the guide groove are engaged with each other, the rod is parallel to the forward/backward moving direction of the drive body, and when the protrusion and the guide groove are not engaged with each other, the rod is tilted with respect to the forward/backward moving direction of the drive body.

Thirdly, the present invention is characterized in that the guide groove of the rod swing mechanism is formed in the rod, and the protrusion of the rod swing mechanism is formed in the housing.

Fourthly, the present invention is characterized in that an elastic body, which urges the rod so that each of the workpiece holding claws of the plurality of rods is brought close to each other, is interposed between the rod and the drive body.

Advantageous Effect of Invention

By adopting the chuck device according to the present invention, the following effects can be obtained.

(1) When holding of the workpiece is released, the plurality of rods integrally swing so that the workpiece holding claws are moved away from the workpiece contact surface of the housing and moved away from each other. Therefore, since the workpiece is held in the forward/backward moving direction of the drive body, which is the thickness direction of the workpiece, in a case where the workpiece is a plate material, the workpiece can be held without being deformed.

(2) When the protrusion and the guide groove are engaged with each other, the rod is parallel to the forward/backward moving direction of the drive body, and when the protrusion and the guide groove are not engaged with each other, the rod is tilted with respect to the forward/backward moving direction of the drive body. Therefore, the rod can be made swingable only by providing a guide groove and a protrusion, so that the rod can be made swingable with a simple configuration.

(3) The guide groove of the rod swing mechanism is formed in the rod, and the protrusion of the rod swing mechanism is formed in the housing. Therefore, since the rod does not easily come into contact with the housing when the rod is accommodated in the housing, the chuck device can be manufactured more easily than in the case where the protrusion of the rod swing mechanism is formed on the rod.

(4) An elastic body, which urges the rod so that each of the workpiece holding claws of the plurality of rods is brought close to each other, is interposed between the rod and the drive body. Therefore, even if a force in the direction of increasing the distance between the workpiece holding claws of the rod is applied to the workpiece holding claws while the workpiece holding claws of the rod are being brought close to the workpiece contact surface, since the urging force by the elastic body is applied to the rod, the plurality of rods can be kept parallel to each other while the workpiece holding claw of the rod is brought close to the workpiece contact surface.

BRIEF DESCRIPTION OF DRAWINGS

FIG. 3A is a perspective view showing the chuck device according to the example of the present invention.

FIG. 5C is a cross-sectional view of the chuck device in a state where the workpiece holding claws are closed and are brought close to the workpiece contact surface.

DESCRIPTION OF EMBODIMENTS

The specific embodiment of the present invention may be arbitrary as long as a chuck device comprises: a plurality of rods provided with workpiece holding claws for holding a workpiece supplied to a machine tool; a support body for supporting each of the plurality of rods; a housing for swingably accommodating each of the plurality of rods around the support body; and a drive body for integrally moving forward and backward the plurality of rods with respect to the housing, wherein the housing has a workpiece contact surface that is arranged so as to face the workpiece holding claws, wherein when holding of the workpiece is released, the plurality of rods integrally swing so that the workpiece holding claws are moved away from the workpiece contact surface of the housing and moved away from each other, and wherein when holding the workpiece, after the plurality of rods integrally swing so that the workpiece holding claws are brought close to the workpiece contact surface of the housing and brought close to each other, the plurality of rods move integrally in parallel with the forward/backward moving direction of the drive body to bring the workpiece holding claws into contact with the workpiece, so that, in a case where the workpiece supplied to the machine tool is a plate material, the workpiece can be held without being deformed.

EXAMPLE

Hereinafter, a chuck device according to an example of the present invention will be described with reference to FIGS. 1 to 5C.

First, the summary of a machine tool 10 in which a chuck device 100 according to the example of the present invention is incorporated will be described with reference to FIGS. 1 and 2.

Figure 1:
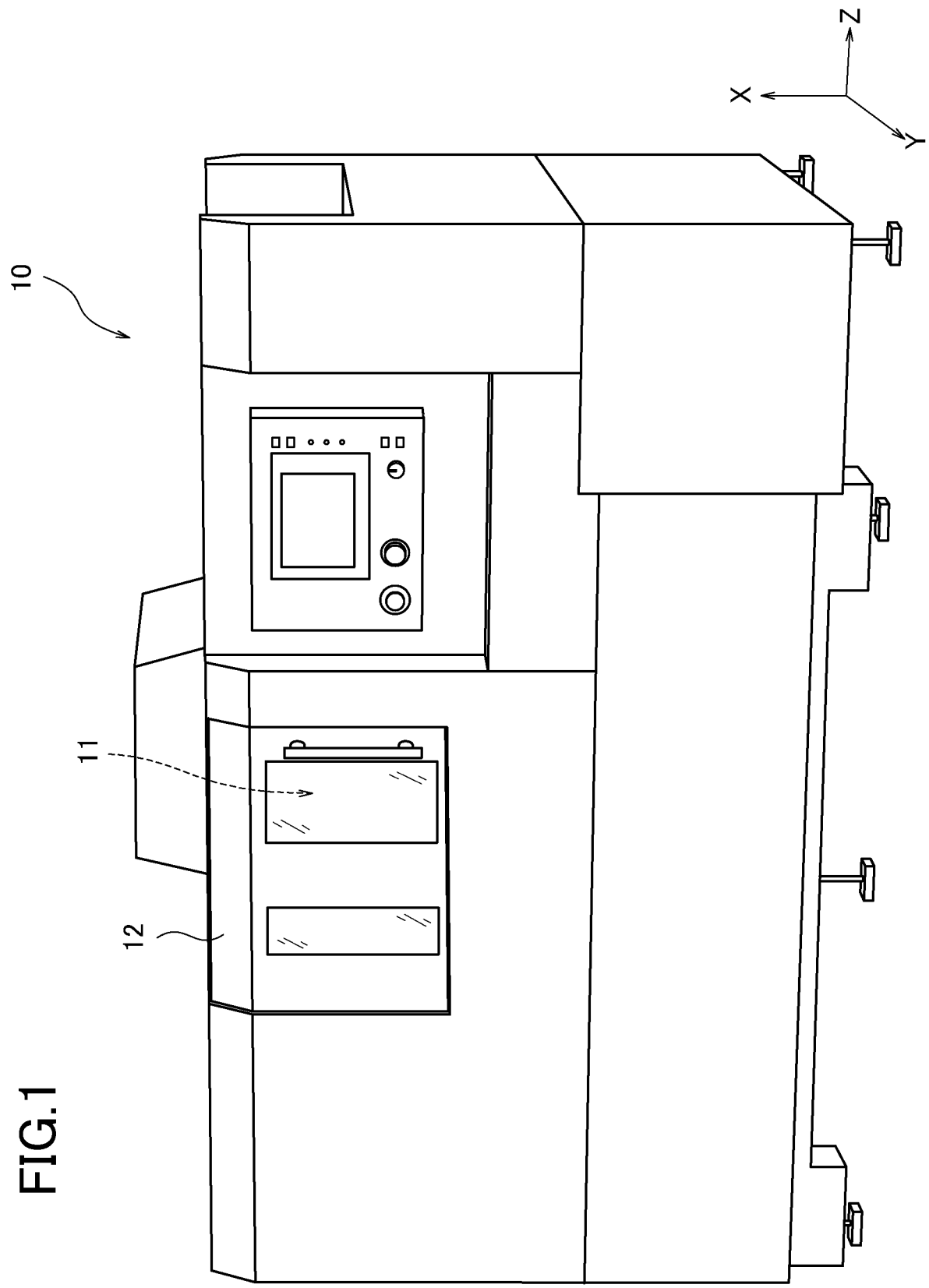
FIG. 1 is a perspective view of a machine tool in which a chuck device according to the example of the present invention is incorporated.
Figure 2:
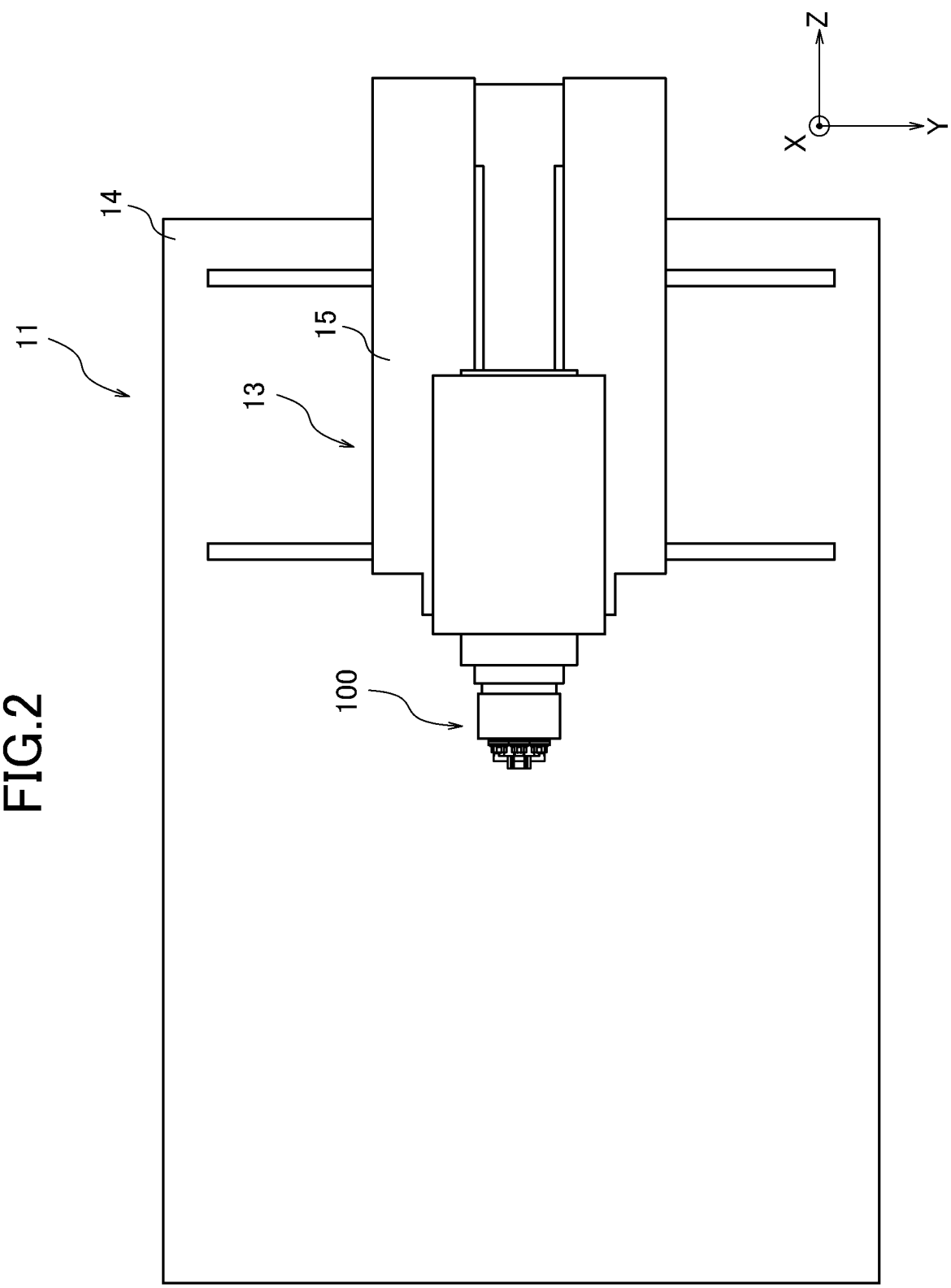
FIG. 2 is a plan view of a machining chamber in the machine tool shown in FIG. 1.

FIG. 1 is a perspective view of the machine tool 10 in which the chuck device 100 according to the example of the present invention is incorporated, and FIG. 2 is a plan view of a machining chamber in the machine tool shown in FIG. 1.

The machine tool 10 has a plurality of machining modules, and as shown in FIG. 1, has a sliding door 12 on the front side for ensuring access to a machining chamber 11 in which the workpiece is processed.

In the machining chamber 11, as shown in FIG. 2, a machining module moving mechanism 13 is provided on a bed 14.

The machining module moving mechanism 13 is movable in the Y direction on the bed 14, and a machining module 15 is mounted on the machining module moving mechanism 13 so as to be movable in the Z direction.

A tool post (not shown) and the chuck device 100 for holding a workpiece supplied to the machine tool 10 are attached to the machining module 15.

Next, the chuck device 100 according to the example of the present invention will be described with reference to FIGS. 3A, 3B and 4.

Figure 3B:
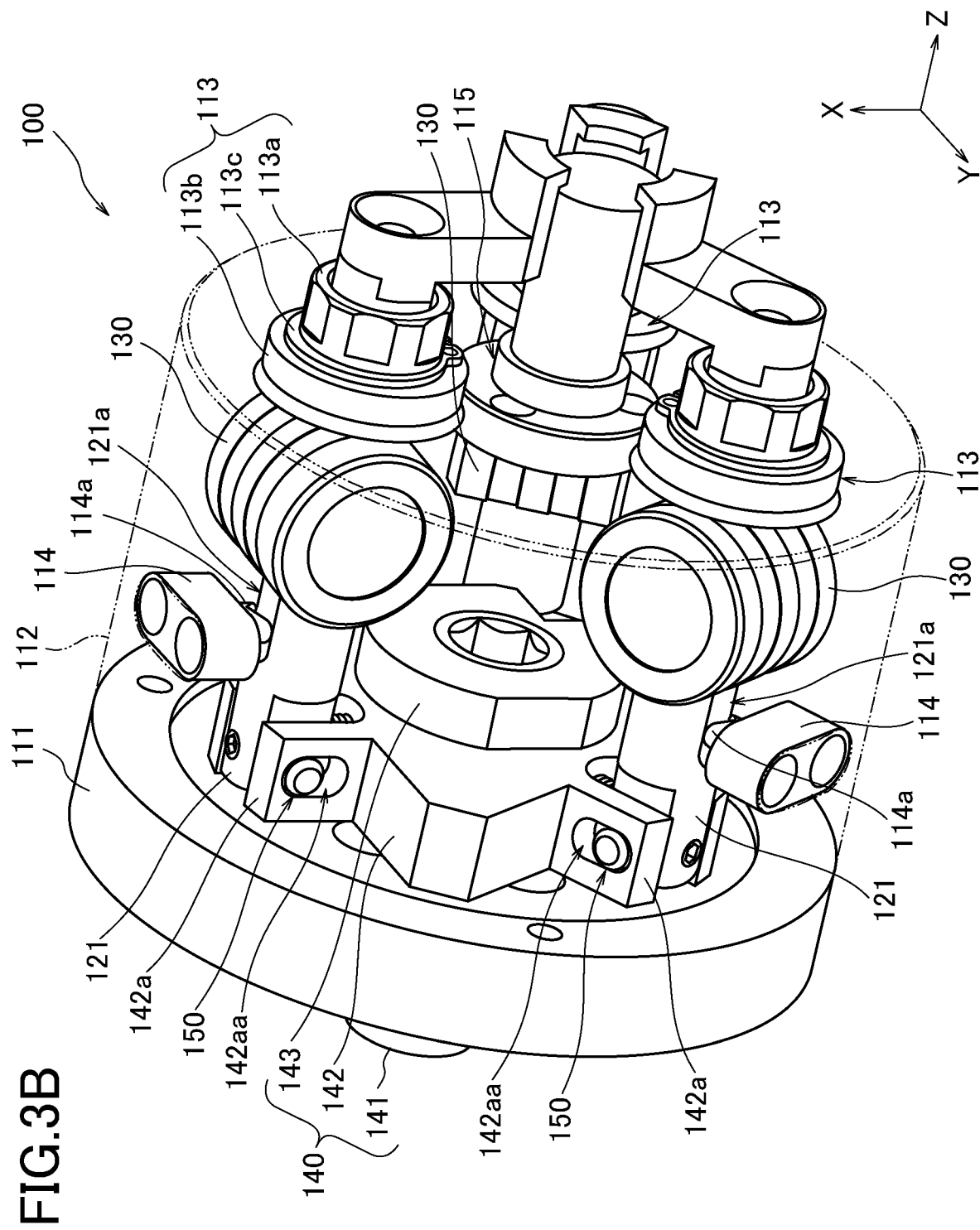
FIG. 3B is a perspective view showing the inside of the chuck device shown in FIG. 3A.
Figure 4:
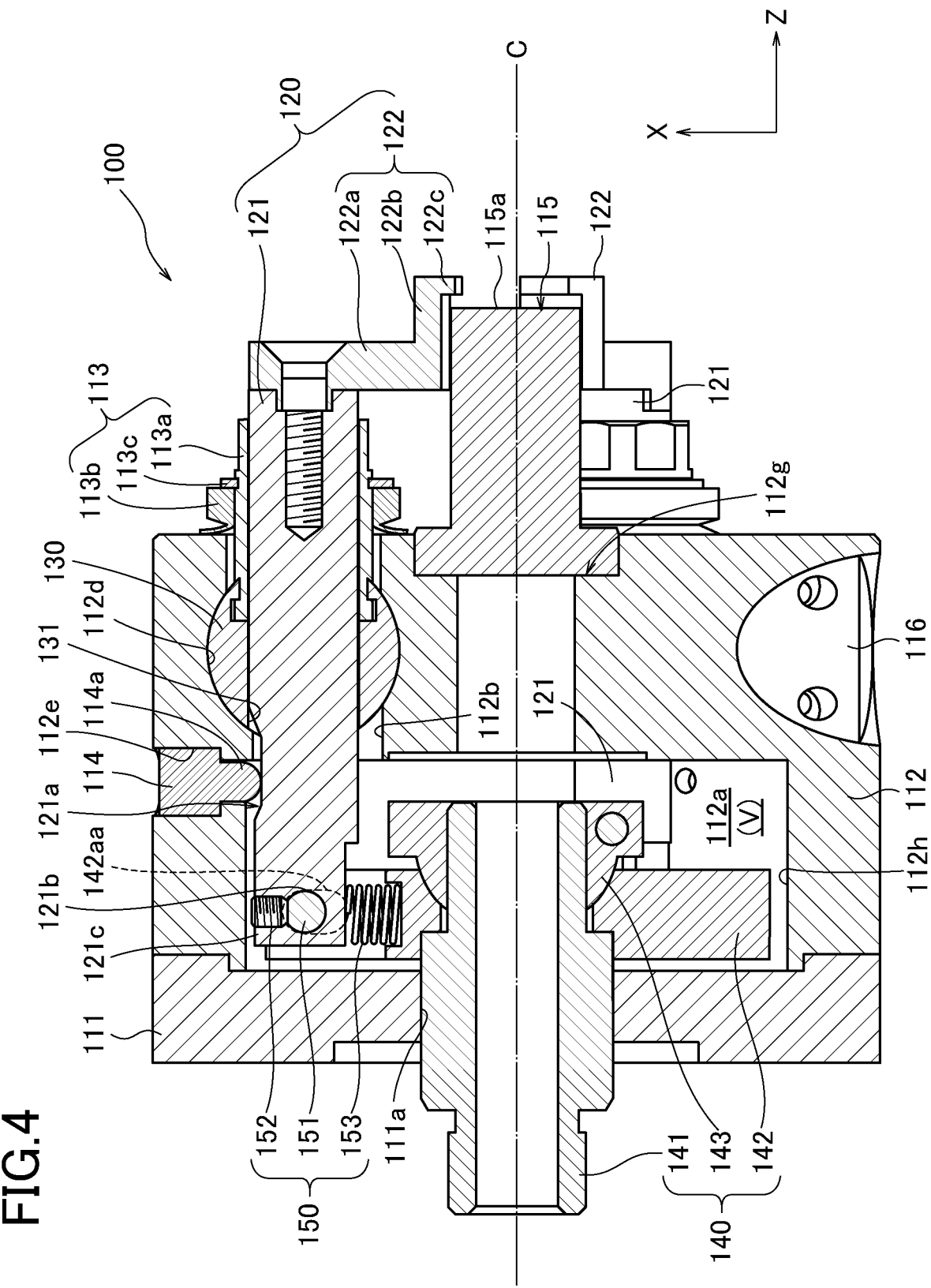
FIG. 4 is a sectional view taken along the line Iv-Iv in FIG. 3A.

FIG. 3A is a perspective view showing the chuck device 100 according to the example of the present invention, FIG. 3B is a perspective view showing the inside of the chuck device 100 shown in FIG. 3A, and FIG. 4 is a sectional view taken along the line IV-IV in FIG. 3A.

As shown in FIG. 3A, the chuck device 100 has a columnar shape, and the rear end side thereof is connected to the machining module 15.

The major axis direction of the chuck device 100 corresponds to the Z direction, and the direction orthogonal to the Z direction and the X direction (vertical direction) corresponds to the Y direction.

As shown in FIGS. 3A, 3B and 4, the chuck device 100 includes a housing 110 that is coupled to the machining module 15 via a drive body 140 described later.

The housing 110 includes a base 111, a housing main body 112 attached to the base 111, a sleeve 113 for slidably holding a rod 120 described later, an engagement member 114 for engaging with a guide groove 121a of the rod 120 described later, a columnar receiving member 115 for receiving the workpiece, and a columnar support body retainer 116 for preventing a support body 130, which is inserted into the housing main body 112 and will be described later, from coming off from the housing main body 112.

The base 111 is a disk-shaped member, and a through hole 111a extending in the Z direction is formed at the center thereof.

The housing main body 112 is a columnar member and is fixed to the base 111 by bolts (not shown).

A cylindrical recess 112a extending in the Z direction is formed on the rear end side of the housing main body 112, and a drive body moving space V for allowing the drive body 140 described later to move forward and backward is formed between the recess 112a and the base 111.

Further, the housing main body 112 is formed with three through holes 112b extending in the Z direction and communicating with the recess 112a.

The central axes of the through holes 112b are substantially parallel to the central axis C of the chuck device 100 and are provided on a single circumference whose center is the central axis C.

The through holes 112b are formed at equal intervals (120-degree intervals in the present example) when viewed from the Z direction.

Further, on a side peripheral surface 112c of the housing main body 112, a support body insertion hole 112d, which is for inserting the support body 130 described later, and an engagement member insertion hole 112e, which is for inserting the engagement member 114, are formed in the same number as the through holes 112b.

Further, a columnar receiving member accommodating recess 112g for accommodating the rear end portion of the receiving member 115 is formed on a front surface 112f of the housing main body 112.

The sleeve 113 has a cylindrical sleeve main body 113a for being inserted into the through hole 112b of the housing main body 112 and engaging with the support body 130 described later, a sealing member 113b for sealing the gap between the sleeve main body 113a and the housing main body 112, and a retaining ring 113c for preventing the sealing member 113b from coming off the sleeve main body 113a.

The engagement member 114 is a columnar member, is inserted into the engagement member insertion hole 112e of the housing main body 112, and is fixed to the housing main body 112.

A V-shaped protrusion 114a (viewed from the Z direction) is formed at the tip (on the central axis C side) of the engagement member 114.

The receiving member 115 is appropriately selected according to the thickness of the workpiece and is inserted and fixed in the receiving member accommodating recess 112g.

Further, a planar workpiece contact surface 115a orthogonal to the Z direction is formed at the front end of the receiving member 115.

The support body retainer 116 is inserted into the support body insertion hole 112d after the support body 130 described later is inserted into the support body insertion hole 112d.

Further, as shown in FIGS. 3B and 4, the chuck device 100 includes three rods 120 that are accommodated in the housing 110 and are movable forward and backward in the housing 110, the three support bodies 130 mounted on the housing 110, the drive body 140 that is mounted on the hosing 110 and moves forward and backward the three rods 120 integrally, and a coupling mechanism 150 that couples the rods 120 and the drive body 140 and swings the three rods 120 integrally.

The rod 120 has a columnar rod main body 121 that is slidable in the support body 130, and a workpiece holding claw 122 coupled to the tip of the rod main body 121 for holding a workpiece.

The rod main body 121 is formed with the guide groove 121a extending in the Z direction (that is, the direction in which the central axis C of the chuck device 100 extends) on the surface that faces an inner peripheral surface 112h of the housing main body 112.

The workpiece holding claw 122 can be replaced with respect to the rod main body 121 depending on the size of the workpiece to be held, and protrudes from the housing 110.

The workpiece holding claw 122 is composed of an arm portion 122a that is coupled to the rod main body 121 and extends toward the central axis C of the chuck device 100, a workpiece contact portion 122b that extends from the tip of the arm portion 122a to the front substantially parallel to the central axis C, and a claw portion 122c that extends from the tip of the workpiece contact portion 122b toward the central axis C and faces the workpiece contact surface 115a of the housing 110 when holding the workpiece.

The support body 130 is a columnar member and swingable with respect to the housing main body 112.

Therefore, the housing 110 swingably accommodates each rod 120 via each support body 130.

Further, the support body 130 is formed with a through hole 131 in the radial direction.

The diameter of the through hole 131 is substantially equal to the diameter of the sleeve main body 113a and the rod main body 121.

Therefore, the support body 130 supports the rod 120 in a loosely inserted state.

The drive body 140 has a drive shaft 141 that moves forward and backward along the central axis C of the chuck device 100 and is inserted through the housing main body 112, a coupling member 142 through which the drive shaft 141 is inserted, and a retainer 143 through which the drive shaft 141 is inserted and for preventing the coupling member 142 from coming off from the drive shaft 141.

One end side of the drive shaft 141 is coupled to the machining module 15, and the other end side is inserted into the housing main body 112.

As a result, the drive shaft 141 is movable forward and backward with respect to the housing 110.

the coupling member 142 is a triangular columnar member, and a rod holding portion 142a protrudes from each side surface.

The rod holding portion 142a is U-shaped when viewed from the Z direction, and accommodates the rod main body 121.

A pin insertion hole 142a a is formed on a surface of the rod holding portion 142a, which faces the rod main body 121.

The coupling mechanism 150 has a coupling pin 151 for being inserted into the rod 120 and the drive body 140, a set screw 152 for preventing the coupling pin 151 from coming off, and a spring (elastic body) interposed between the rod 120 and the drive body 140.

The coupling pin 151 is inserted through the pin insertion hole 142a a of the drive body 140 and a through hole 121b formed on the back side of the rod main body 121.

The set screw 152 is screwed into a screw hole 121c orthogonal to the through hole 121b formed in the rod main body 121 and is in contact with the coupling pin 151.

A spring 153 urges the rod 120 in the direction away from the central axis C of the chuck device 100.

Next, holding of the workpiece by the rod swing mechanism of the chuck device 100 according to the example of the present invention configured as described above will be described with reference to FIGS. 4, 5A to 5C.

Figure 5A:
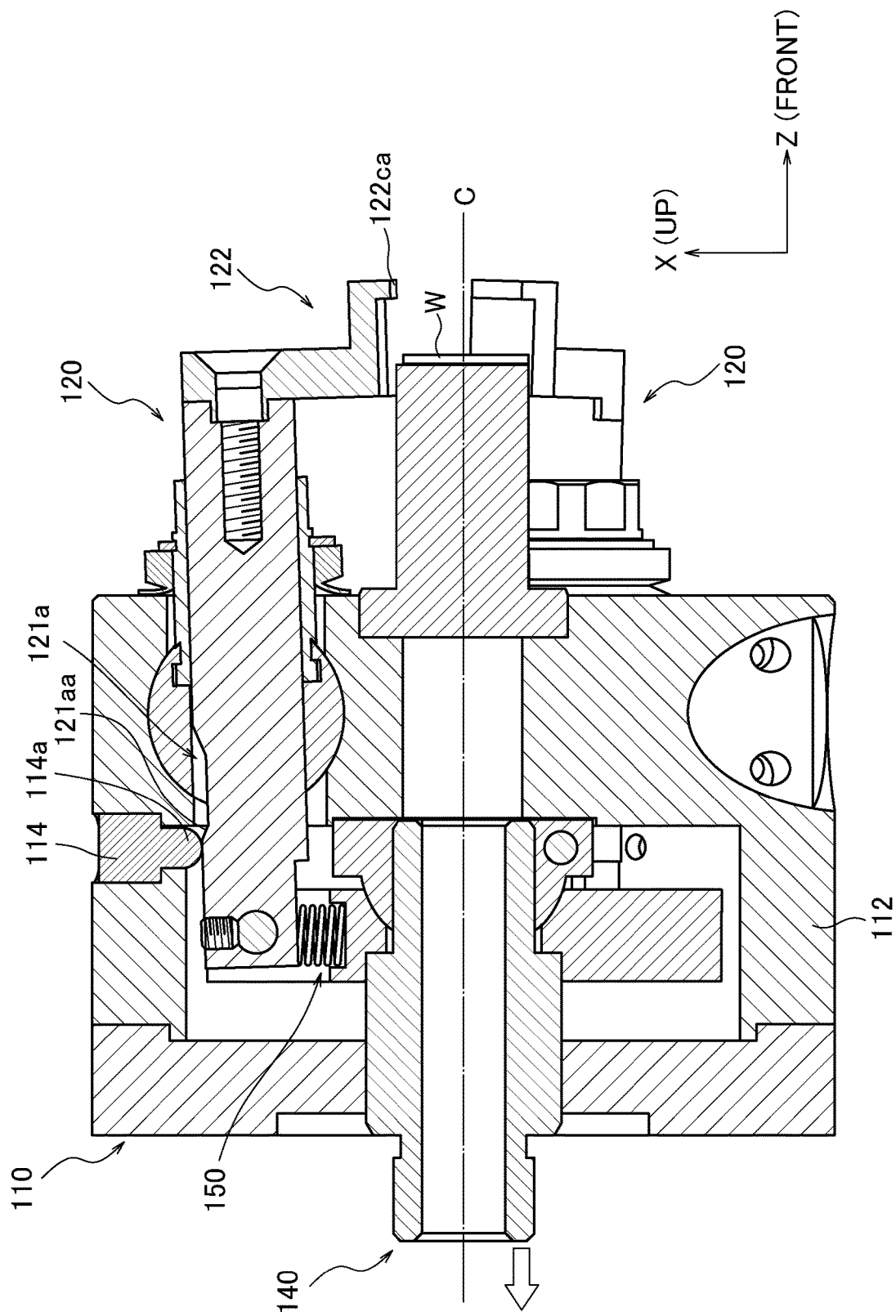
FIG. 5A is a cross-sectional view of the chuck device in a state where the workpiece holding claws are opened.
Figure 5B:
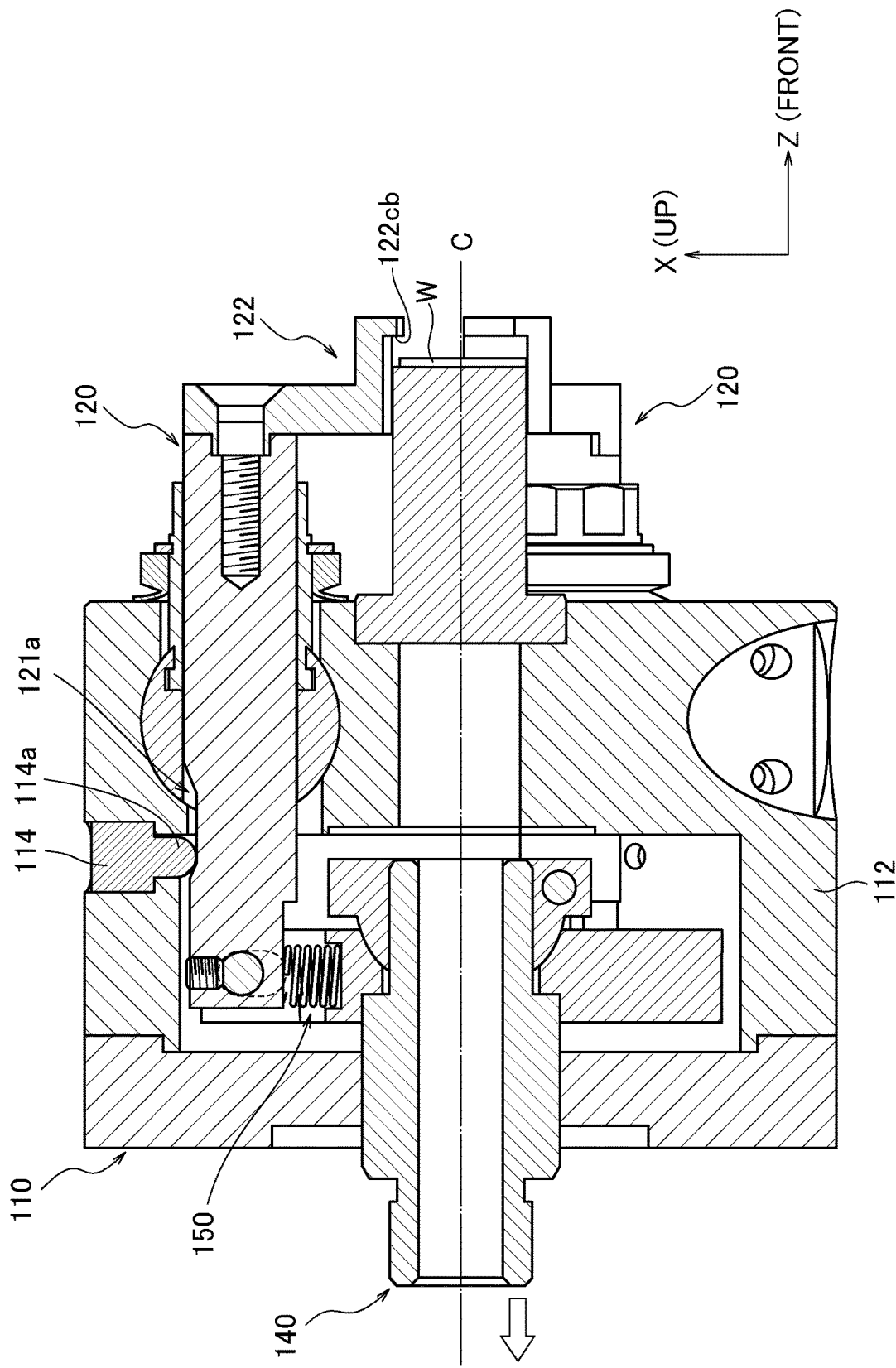
FIG. 5B is a cross-sectional view of the chuck device in a state where the workpiece holding claws are closed and the workpiece is held.

FIG. 5A is a cross-sectional view of the chuck device 100 in a state where the workpiece holding claws 122 are opened, FIG. 5B is a cross-sectional view of the chuck device 100 in a state where the workpiece holding claws122 are closed and the workpiece is held, and FIG. 5C is a cross-sectional view of the chuck device 100 in a state where the workpiece holding claws 122 are closed and are brought close to the workpiece contact surface 115a.

First, when the drive body 140 is moved forward in the Z direction from the state where the workpiece holding claw 122 is closed as shown in FIG. 4 (the state where the rod 120 is substantially parallel to the central axis C of the chuck device 100), the three rods 120 coupled to the drive body 140 by the coupling mechanism 150 also move forward in the Z direction.

When the protrusion 114a of the engagement member 114 climbs a rear end slope 121d (see FIG. 5A) formed on the rear end side of the guide groove 121a of the rod 120, since the engagement member 114 is fixed to the housing main body 112, the rod 120 moves to the central axis C side of the chuck device 100 due to the engagement member 114.

At this time, since the support body 130 is swingable with respect to the housing 110 (housing main body 112), the rod 120 loosely inserted into the support body 130 swings around the support body 130, and the workpiece holding claw 122 of the rod 120 swings in the direction away from the central axis C of the chuck device 100.

Therefore, when the protrusion 114a climbs the rear end slope 121d of the rod 120 and the protrusion 114a and the guide groove 121a are not engaged, the rod 120 tilts with respect to the central axis C of the chuck device 100 (the forward/backward moving direction of the drive body 140), and the workpiece holding claw 122 is opened as shown in FIG. 5A (a state where an inner end surface 122c a of the workpiece holding claw 122, which is parallel to the central axis C of the chuck device 100, is widely open than the receiving member 115 when viewed from the Z direction).

The chuck device 100 can receive a workpiece W in this state.

Then, a workpiece loading device (not shown) brings the workpiece W into contact with the workpiece contact surface 115a of the chuck device 100.

When the drive body 140 is moved backward in the Z direction from this state, the three rods 120 coupled to the drive body 140 by the coupling mechanism 150 also move backward in the Z direction.

When the protrusion 114a of the engagement member 114 descends the rear end slope 121d of the rod 120, since the protrusion 114a of the engagement member 114 is fixed to the housing main body 112 and the rod 120 is urged to the outer peripheral side of the housing main body 112 by the spring 153, the rod 120 moves to the side away from the central axis C of the chuck device 100 due to the engagement member 114.

At this time, since the support body 130 is swingable with respect to the housing 110 (housing main body 112), the rod 120 loosely inserted into the support body 130 swings around the support body 130, and the workpiece holding claw 122 of the rod 120 swings in the direction approaching the central axis C of the chuck device 100.

Therefore, when the protrusion 114a descends the rear end slope 121d of the rod 120 and the protrusion 114a and the guide groove 121a are engaged, the rod 120 is substantially parallel to the central axis C of the chuck device 100 (the forward/backward moving direction of the drive body 140), and the workpiece holding claws 122 are closed as shown in FIG. 5B.

Further, the direction in which the spring 153 urges the rod 120 is a direction such that the distance between the workpiece holding claws 122 of the rod 120 becomes shorter.

When the drive body 140 is further moved backward in the Z direction from this state, the three rods 120 coupled to the drive body 140 by the coupling mechanism 150 are also further moved rearward in the Z direction.

At this time, since the protrusion 114a of the engagement member 114 is fixed to the housing main body 112, when the rod 120 moves backward in the Z direction, the protrusion 114a of the engagement member 114 slides in the guide groove 121a in a state of engaging with the guide groove 121a of the rod 120.

As a result, the rod body 120 moves backward in the Z direction in a state where the rod body 120 is kept parallel to the central axis C of the chuck device 100 (that is, the forward/backward moving direction of the drive body 140). Then, the side end surface 122c b of the workpiece holding claw 122 is brought into contact with the workpiece W as shown in FIG. 5C, and the workpiece W is held by the claw portion 122c of the workpiece holding claw 122 and the workpiece contact surface 115a. That is, the workpiece W is held in the thickness direction of the workpiece W.

When the rod 120 moves backward in the Z direction while the rod body 120 is kept parallel to the central axis C of the chuck device 100, since the rod 120 is urged to the outer peripheral side of the housing main body 112 by the spring 153, the rod 120 continues to be urged in the direction so that the distance between the workpiece holding claws 122 of the rod 120 becomes shorter.

Therefore, the rod swing mechanism is composed of the guide groove 121a of the rod 120, the protrusion 114a of the housing 110, the support body 130, the drive body 140 and the like, and swings the three rods 120 integrally.

Then, by adopting this rod swing mechanism, when holding of the workpiece W is released, the plurality of rods 120 integrally swing so that the workpiece holding claws 122 are moved away from the workpiece contact surface 115a of the housing 110 and moved away from each other, and when holding the workpiece W, after the plurality of rods 120 integrally swing so that the workpiece holding claws 122 are brought close to the workpiece contact surface 115a of the housing 110 and brought close to each other, the plurality of rods 120 move integrally in parallel with the forward/backward moving direction of the drive body 140 to bring the workpiece holding claws 122 into contact with the workpiece W.

As a result, even if the workpiece W is a thin plate material, the workpiece W can be held without being deformed.

Further, since the rod 120 and the drive body 140 are connected by the spring 153 that urges the rod 120 in the direction so that the distance between the workpiece holding claws 122 of the rod 120 becomes shorter, even if a force in the direction of increasing the distance between the workpiece holding claws 122 of the rod 120 is applied to the workpiece holding claws 122 while the workpiece holding claws 122 of the rod are being brought close to the workpiece contact surface 115a, the plurality of rods 120 can be kept parallel to each other while the workpiece holding claw 122 of the rod 120 is brought close to the workpiece contact surface 115a because the urging force by the spring 153 is applied to the rod 120.

The example of the present invention has been described above. However, the present invention is not limited to the above example.

For example, in the present example, the machine tool 10 is provided with one machining module moving mechanism 13, one machining module 15 and one chuck device 100. However, the number of each component is not limited to that in the present example.

For example, in the present example, the chuck device 100 is not movable in the X direction in the machine tool 10. However, the chuck device may be movable in the X direction.

For example, in the present example, the number of rods 120 of the chuck device 100 is three. However, the number of rods is not limited to three as long as the number of rods is plural.

The number of support bodies is not limited as well as the number of the rods.

For example, in the present example, the rod swing mechanism is composed of the guide groove 121a of the rod 120 and the protrusion 114a of the housing 110. However, the protrusion may be provided on the rod side and the guide groove may be provided on the housing side.

For example, the shape of the workpiece may be any shape in a plan view as long as the thickness is sufficiently smaller than the width and height.

REFERENCE SIGNS LIST 10 machine tool
11 machining chamber
12 door
13 machining module moving mechanism
14 bed 15 machining module
100 chuck device
110 housing
111 base
111a through hole
112 housing main body
112a recess
112b through hole
112c side peripheral surface
112d support body insertion hole
112e engagement member insertion hole
112f front surface
112g receiving member accommodating recess
112h inner peripheral surface
113 sleeve
113a sleeve main body
113b sealing member
113c retaining ring
114 engagement member
114a protrusion
115 receiving member
115a workpiece contact surface
116 support body retainer
120 rod
121 rod main body
121a guide groove
121b through hole
121c screw hole
121d rear end slope
122 workpiece holding claw
122a arm portion
122b workpiece contact portion
122c claw portion
122c a inner end surface
122c b side end surface
130 support body
131 through hole
140 drive body
141 drive shaft
142 coupling member
142a rod holding portion
142a a pin insertion hole
143 retainer
150 coupling mechanism
151 coupling pin
152 set screw
153 spring (elastic body)
V drive body moving space
C central axis
W workpiece

The invention claimed is:

1. A chuck device comprising:
a plurality of rods provided with workpiece holding claws for holding a workpiece supplied to a machine tool;
a support body for supporting each of the plurality of rods;
a housing for swingably accommodating each of the plurality of rods around the support body; and
a drive body for integrally moving forward and backward the plurality of rods with respect to the housing,
wherein the housing has a workpiece contact surface that is arranged so as to face the workpiece holding claws,
wherein, when holding of the workpiece is released, the plurality of rods integrally swings so that the workpiece holding claws are moved away from the workpiece contact surface of the housing and moved away from each other, and
wherein, when holding the workpiece, after the plurality of rods integrally swings so that the workpiece holding claws are brought close to the workpiece contact surface of the housing and brought close to each other, the plurality of rods moves integrally in parallel with the forward/backward moving direction of the drive body to bring the workpiece holding claws into contact with the workpiece,
wherein the chuck device further comprises a rod swing mechanism for swinging each of the plurality of rods around the support body,
wherein the rod swing mechanism has a guide groove and a protrusion for engaging with the guide groove,
wherein, when the protrusion and the guide groove are engaged with each other, the rod is parallel to the forward/backward moving direction of the drive body, and
wherein, when the protrusion and the guide groove are not engaged with each other, the rod is tilted with respect to the forward/backward moving direction of the drive body,
wherein the guide groove of the rod swing mechanism is formed in the rod, and
wherein the protrusion of the rod swing mechanism is formed in the housing,
wherein an elastic body, which urges the rod so that each of the workpiece holding claws of the plurality of rods is brought close to each other, is interposed between the rod and the drive body.

* * * * *